US008628229B1

(12) United States Patent
Mc Neil

(10) Patent No.: US 8,628,229 B1
(45) Date of Patent: Jan. 14, 2014

(54) MODULAR ILLUMINATED FRAMING

(71) Applicant: Luchae, Pleasanton, CA (US)

(72) Inventor: Malcolm Mc Neil, Pleasanton, CA (US)

(73) Assignee: Luchae, Pleasanton, CA (US)

( * ) Notice: Subject to any disclaimer, the term of this patent is extended or adjusted under 35 U.S.C. 154(b) by 0 days.

(21) Appl. No.: 13/735,222

(22) Filed: Jan. 7, 2013

(51) Int. Cl.
*F21V 7/04* (2006.01)
*B64D 47/06* (2006.01)

(52) U.S. Cl.
USPC ....................... 362/612; 362/607; 362/249.02

(58) Field of Classification Search
USPC ......... 362/612, 607, 147–150, 404, 602, 632, 362/613, 633, 634, 249.02, 249.05, 249.06
See application file for complete search history.

(56) References Cited

U.S. PATENT DOCUMENTS 5,815,971 A * 10/1998 Rothe et al. ..................... 40/718
2006/0285358 A1* 12/2006 Chen et al. .................... 362/613

OTHER PUBLICATIONS

Evonik/CRYO Industries brochure, (C) 2008.
Evonik/Cryo Industries brochure, (C) 2009.
Degussa Cryo Industries brochure.
Clearr Corporation brochure.
Zcube brohure.
SDM brochure.
Prismex Illumination Systems brochure.
Swingframe brochure.
Inlite Corporation brochure.
MDI brochure.
Productos Cuauhtli brochure.
Cyber Graphics brochure.
ILM International Linear Matrix brochure.
Carmanah Signs brochure.
Techsign Light Panel brochure.
Lumibright brochure.
Fawoo Technology brochure.
Shanghai Pallas Electric Company brochure.
MDI bochure.
Pretty Sun Light-Boxes & Pop Display Mfg Co brochure.
DS4/Phototech Inc brochure.
Unnamed brochure.
Jumpro Inc brochure.
Clearr Corporation XXLite brochure.
LEDCONN brochure.
Light-Master brochure.
E&G brochure.
Vivacity Illuminated SIgnage brochure.
On-nuri Electronics Lumiad brochure.
SD Modular brochure.
Sprin USA brochure.
Slim Light Sinology Enterprise brochure.

* cited by examiner

*Primary Examiner* — Anh Mai
*Assistant Examiner* — Elmito Breval
(74) *Attorney, Agent, or Firm* — Gard & Kaslow LLP

(57) ABSTRACT

An improved modular illuminated frame member for framing translucent or transparent display articles. A transparent or translucent display article is framed using one or more modular illuminated frame members. The illuminated frame member contains two or more light emitting diode (LED) lighting modules, which direct light into the edge of alight guide assembly which illuminates the display article. The number of LED lighting modules in the frame member determines the frame member length; frame members with different numbers of LED lighting modules have different lengths. The frame member may be used as a heatsink for the LEDs. Dummy non-illuminated frame members are provided in matching lengths. The frame members may be encased in a further decorative frame. Using a set of modular illuminated frame members and dummy frame members of various lengths, frames for a wide range of display article sizes may be easily assembled.

19 Claims, 7 Drawing Sheets

MODULAR ILLUMINATED FRAMING

BACKGROUND

1. Field of the Invention

The present invention relates generally to frames for transparent or translucent displays, and more particularly, to side-lit displays.

2. Description of the Prior Art

Displays of art and information have always been a part of man's life. Most such displays have been front lit, where light shines on the object of interest, and front lighting continues to dominate, from the heights of art to the mundane such as posted schedules at bus stops.

With the advent of artificial lighting and the ability to produce and reproduce pictures and information on transparent or translucent materials, backlit displays have evolved, where light shines through the object being displayed.

One form of backlit display uses a light box containing a light source such as a plurality of fluorescent lamps, with a transparent or translucent display object on the front of the light box. Unless the light box has sufficient depth to provide for diffusion of the light from the lamps, a diffusion layer is placed between the lamps and the display object to diffuse the light, providing even levels of light over the display object. Such light boxes tend to be large and bulky to house the fluorescent lamps. The lamps and their ballasts generate heat. Fluorescent tubes have a finite operating life and must be replaced when they fail. With these limitations, light boxes are widely used to display pictures and information.

A premier example of a light box display was the Kodak Colorama at the East balcony of New York City's Grand Central Terminal, which displayed 18×60 foot rear-lighted transparencies for forty years, from 1950-1990.

More mundane examples of fight box displays include back-lit advertising displays in airports and other public and commercial venues, menu and product displays at fast food establishments, and the like.

Back-lit and light box display technology changed with the development of inexpensive light emitting diodes (LEDs), particularly with the availability of powerful LEDs capable of producing white light.

With LEDs, the bulky light box filled with fluorescent tubes is transformed into a thinner package featuring a side lit light guide.

The light guide is typically an acrylic plastic panel 4 mm or more in thickness with a white reflective backing and a treatment for dispersing light from the front surface of the panel. This treatment may be in the form of etched or printed patterns on the front surface of the panel, or in small particles dispersed within the panel.

The light guide panel is side lit using LEDs. LEDs are mounted to direct their light into the edges of the light guide panel. Depending on the size of the light guide panel, the intensity of the LEDs, and the amount of light required, LEDs may be placed along one or more sides of the light guide panel.

The resulting side lit framed panel is much thinner than older light boxes, and relatively maintenance free through the use of long life LEDs.

A problem arises with these panels. For commercial applications involving large quantities, they are economical when compared with older technologies.

But for other than standard sizes and large quantities, the economies are not present. Frames for side lighting are made in standard sizes in large quantities. But such frames are not amenable to the myriad of shapes and sizes required for framing art in the real world; art seldom deals in standard sizes, nor can such art be easily resized to fit a standard. Nor is it economical to build one or two custom-sized side lit frames at a time.

What is needed is a way to adapt such side lit frames to a wider range of sizes.

SUMMARY

In one embodiment is provided a modular illuminated frame member for framing a transparent or translucent flat display article such as a photograph or informational display. The display article is mounted to a light guide assembly. One or more modular illuminated frame members frame the light guide assembly and supply side illumination to the light guide; this illumination is directed out of the light guide assembly through the display article. These frame members may be enclosed in a decorative outer frame. The modular illuminated frame member comprises two or more light emitting diode (LED) lighting modules mounted in a channel in the frame member, directing light from the LEDs into an edge of the light guide. The number of LED lighting modules in the modular illuminated frame member determines the length of the modular illuminated frame member. Illuminated frame members of different lengths are produced using different numbers of LED lighting modules. The frame member may be a metal such as aluminum, or other material, and may be cast, extruded, machined, or produced by other known forming processes. The LED lighting modules are mounted in a channel in the frame member sized to fit the light guide assembly. The spacing between a top surface of the LEDs and the edge of the light guide assembly may be determined by either direct contact between the top surface of the LEDs and the edge of the light guide assembly, or by a spacer element establishing a separation between the top surface of the LEDs and the edge of the light guide assembly. The frame member may provide heat sinking to the LEDs; additional heat sinking may be provided by a heat conductive backing on the light guide assembly such as an aluminum plate. Dummy frame members, without LED lighting modules, are provided in modular lengths.

Using the modular illuminated frame members and the corresponding modular dummy frame members, a wide range of display articles may be framed using a set of standard components.

In one embodiment, a modular illuminated frame member comprises a channel element having a front member, a rear member, and a side member joining the front and rear members, where a distance between the front and rear members of the channel element is sized to be approximately equal to the thickness of a light guide assembly, and a modular light emitting diode (LED) lighting strip having two or more LED lighting modules, each LED lighting module having a substrate and a light emitting diode (LED) attached to the substrate, the LED lighting strip attached to the side member between the front and rear members wherein the LED lighting strip is adapted to set a distance between the LEDs on the two or more LED lighting modules and an edge of the light guide assembly, and wherein a length of the modular illuminated frame member is determined by the number of the two or more LED lighting modules present in the LED lighting strip.

In one embodiment a modular framing system comprises a modular illuminated frame member having an illuminated channel element with a front member, a rear member, and a side member joining the front and rear members, where a distance between the front and rear members of the illuminated channel element is sized to be approximately equal to a thickness of a light guide assembly, and a modular light emitting diode (LED) lighting strip having two or more LED lighting modules, each LED lighting module having a substrate with an LED and a spacer element both attached to the substrate, the LED lighting strip attached to the side member between the front and rear members wherein the LED lighting strip is adapted to set a distance between the spacer element on the two or more LED lighting modules and an edge of the light guide assembly, and wherein a length of the modular illuminated frame member is determined by the number of the two or more LED lighting modules present in the LED lighting strip; and a dummy modular frame member having a dummy channel element, the dummy channel element having a front member, a rear member, and a side member joining the front and rear members, wherein a distance between the front and rear members of the dummy channel element is sized to be approximately equal to the thickness of the light guide assembly, and wherein an inset depth of the dummy modular frame member is the same as an inset depth of the modular illuminated frame member.

DETAILED DESCRIPTION

Described herein are various embodiments of modular illuminated frame members used to frame and illuminate a transparent or translucent display article such as a photograph or informational display. A display article is mounted to a light guide assembly. One or more modular illuminated frame members frame the light guide assembly and supply illumination to the light guide; this illumination is directed out of the light guide assembly through the display article. The framed display article may be enclosed in a further decorative frame.

The modular illuminated frame member comprises a channel containing two or more light emitting diode (LED) lighting modules. One or more LEDs in each LED lighting module direct light into an edge of the light guide assembly. In some embodiments, spacing between a top surface of the LEDs and the edge of the light guide is maintained by either having the top LED surface in direct contact with the edge of the light guide assembly, or by a spacer element maintaining the separation between the top LED surface and the edge of the light guide assembly. The frame member may be made of metal, such as aluminum, or other materials, and may be produced by casting, extrusion, milling, or other known forming processes. The frame member may be used as a heat sink for the LEDs. A backing of the light guide assembly may also be used as a heat sink. The number of LED lighting modules determines the length of the channel and of the frame member. Illuminated frame members of different lengths are produced using different numbers of LED lighting modules. Dummy frame members of these same lengths are also produced without the LED lighting modules.

In use, display articles of a wide range of sizes may be framed using a set of different sized modular illuminated frame members and modular dummy frame members.

Figure 1:
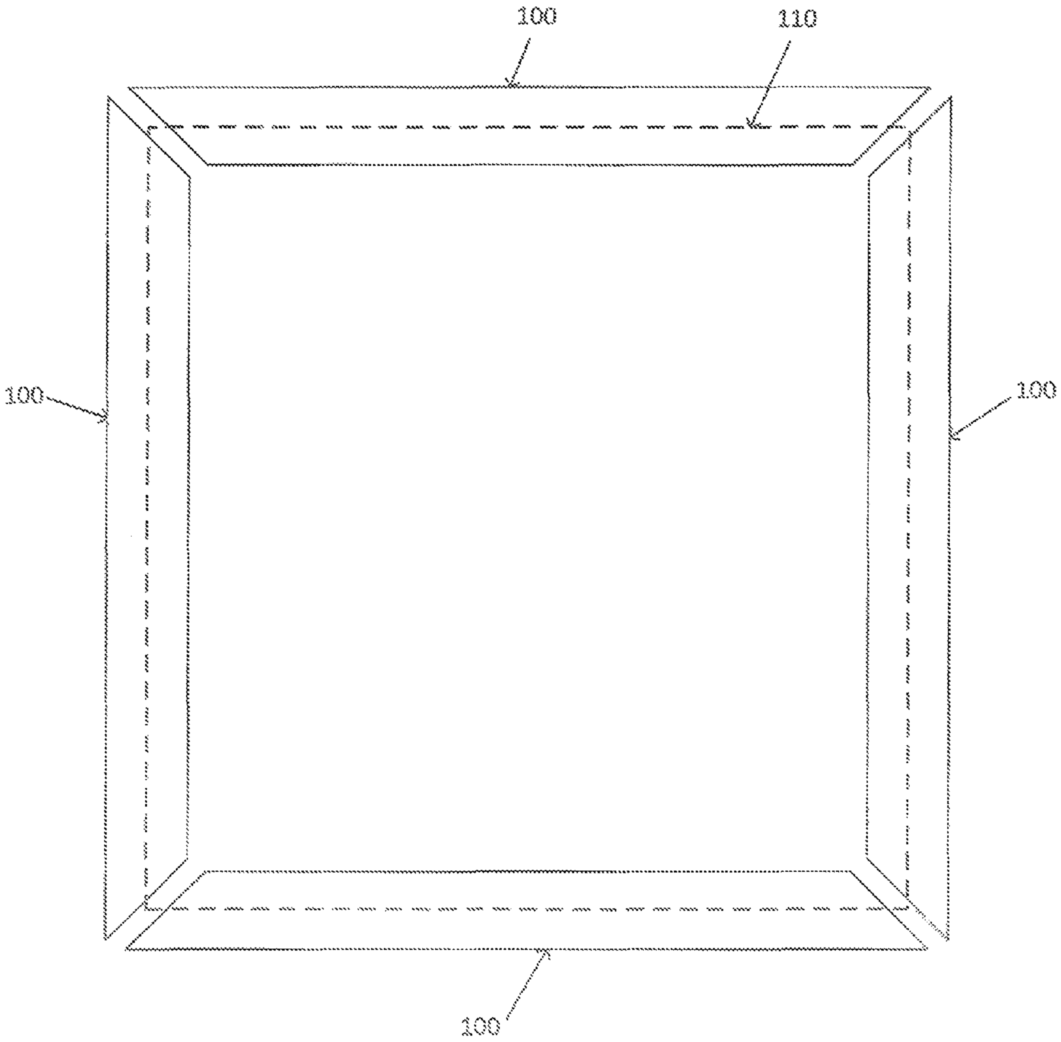
FIG. 1 is a diagram of a frame using modular members according to an embodiment.

Referring now to FIG. 1, an embodiment of a modular frame is shown in a front view. Modular illuminated frame members 100 fit around light guide assembly 110. Depending on the illumination requirements of the display article associated with light guide assembly 110, one or more modular illuminated frame members 100 may be used to frame the light guide assembly. Small display articles may only require one modular illuminated frame member 100, while larger and/or more optically dense display articles may require two or more modular illuminated frame members. The remaining frame members may be non-illuminated, as will be discussed further herein. It should be understood that while rectangular embodiments are shown, non-rectangular embodiments are also possible.

Figure 2:
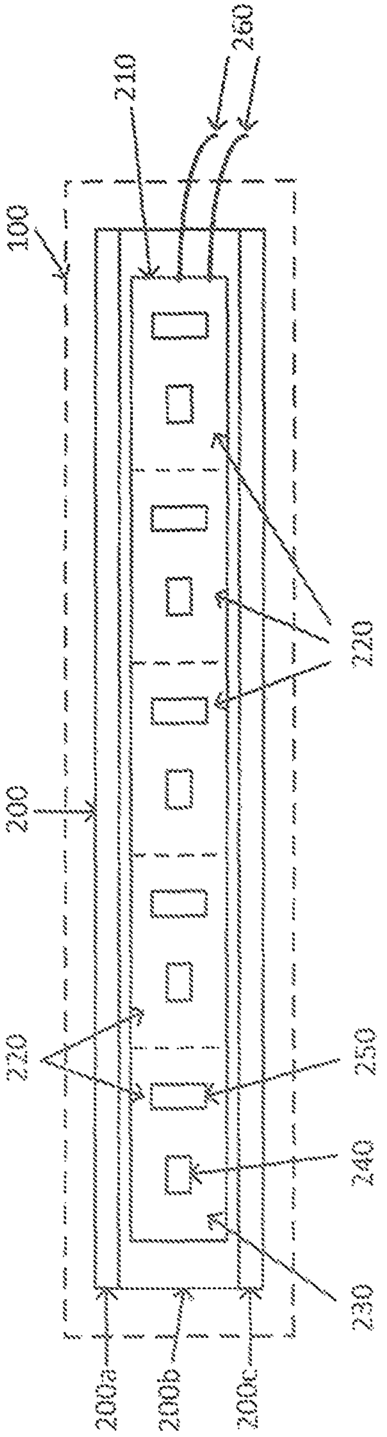
FIG. 2 is a diagram of a modular frame member according to another embodiment.

FIG. 2 shows a side view looking into channel 200 of modular illuminated frame member 100 according to an embodiment. Channel 200 contains a light emitting diode (LED) lighting strip 210 which is composed of two or more LED lighting modules 220. FIG. 2 shows an LED lighting strip 210 composed of five LED lighting modules 220.

Channel 200 has a front member 200*a*, a rear member 200*c*, and a side member 200*b* joining front member 200*a* and rear member 200*c*. LED lighting modules 220 are attached to side member 200*b*. For example, as mounted on a wall, rear member 200*c* faces the wall, and front member 200*a* faces away from the wall.

In one embodiment, channel 200 is made of a metal such as aluminum, although other materials may be used. The channel may be machined, extruded, cast, or produced using other techniques known to the forming arts. While other materials may be used, such as plastics or filled plastics, materials which may serve as heat sinks for dissipating the heat produced by LED lighting modules 220 are preferred.

Each LED lighting module 220 comprises a substrate 230 to which is mounted one or more LEDs 240, and optionally a spacer element 250. Not shown are power distribution traces on substrate 230, and support components for LED 240. Support components for LED 240 could be as simple as a current-limiting resistor as is known to the art, or as complex as a constant-current source or an addressable LED controller. In one embodiment, six LEDs are used per module.

Power connections 260 electrically connect a set of LED lighting modules 220 forming a LED lighting strip 210 to additional LED lighting strips in other modular illuminated frame members, or to an external power source. While two lines 260 are shown representing a simple power connection, more lines may be used if, for example, LED lighting modules 220 contain controller circuitry requiring more lines for data.

In one embodiment, LEDs producing white light are used; other embodiments may use LEDs of other colors, including red-green-blue (RGB) LEDs with integrated controllers. Optionally, LEDs may be matched or selected for color balance and intensity. Color balance and intensity may be less critical with certain display articles, such as product displays, but may be more critical in others, such as photographs or artworks.

Substrate 230 may be a common epoxy-fiberglass substrate used for printed circuit boards known commercially as FR4. Other substrates such as phenolics may be used. A substrate such as Kapton® may also be used. Thermal vias, known to the printed circuit arts, may be placed in substrate 230 underneath LEDs 240 to aid heat transfer away from the LEDs.

The number of LED lighting modules 220 present determines the length of channel 200, and of modular illuminated frame member 100. A shorter channel can contain fewer LED lighting modules, and a longer channel can contain more, with the lengths available for modular illuminated frame member 100 related to multiples of the length of an individual LED lighting module 220.

Figure 3:
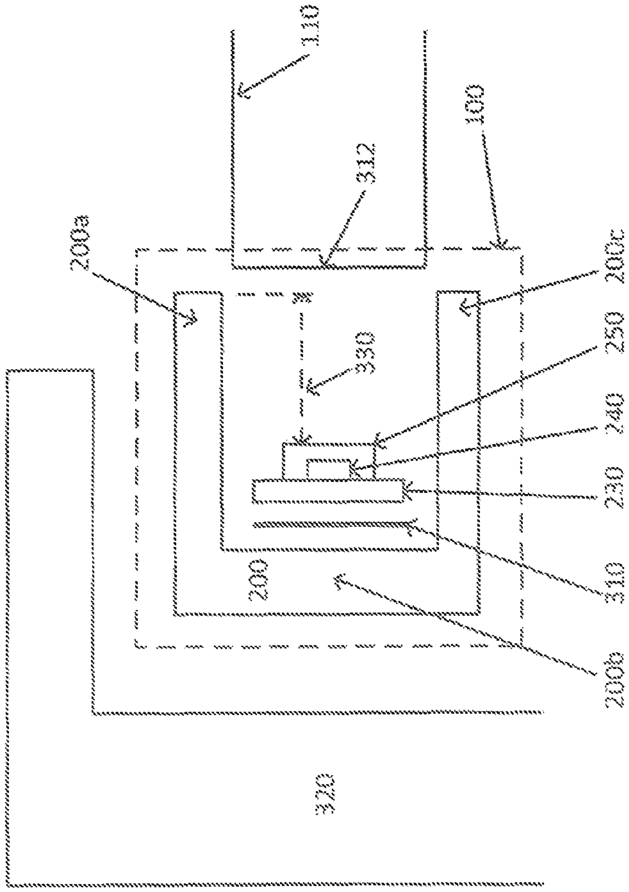
FIG. 3 is a diagram of a modular frame member according to another embodiment.

FIG. 3 shows an end view looking into channel 200 of modular illuminated frame member 100 according to an embodiment. Channel 200 is sized to hold light guide assembly 110.

In practice, light guide assembly 110 is typically a plastic material such as an acrylic plastic sheet 4 mm or more in thickness with a reflective backing applied to the rear surface of the acrylic sheet, the display article applied to the front surface, and light introduced to one or more edges. Light from LED lighting modules 220 enters edge 312 of the light guide assembly. This light is dispersed to the front surface of the light guide assembly, illuminating the transparent or translucent article on the light guide assembly. In one embodiment, a 4 mm acrylic panel, a white reflective backing layer, and a 2 mm aluminum backing plate are combined to form a light guide assembly. Use of a backing material such as aluminum also allows the use of the backing material as a heatsink, as will be described.

Channel 200 has a front member 200*a*, a rear member 200*c*, and a side member 200*b* joining front member 200*a* and rear member 200*c*. LED lighting modules 220 are attached to side member 200*b*. In one embodiment this attachment is made using an adhesive 310 between substrate 230 and channel side member 200*b*.

Adhesive 310 may be chosen for its thermal properties, supporting the use of channel 200 as a heat sink for LEDs 240. For example, a double-sided heat-transfer tape such as 3M® Thermally Conductive Adhesive Transfer Tapes may be used as an adhesive. Thermal transfer epoxies may also be used; these are available from 3M® and other manufacturers.

Non-adhesive solutions may also be used, such as screws, rivets, or other means to secure substrate 230 to the channel side member 200*b*. Multiple approaches may also be used, as an example, combining screws with a heat transfer material.

Heat transfer materials between substrate 230 and channel side member 200*b* aid in removing heat from LEDs 240, reducing their temperature. Non-adhesive heat transfer solutions are available, and may be used in some embodiments, including hut not limited to thermal grease or paste, non-adhesive tapes, and the like.

In some embodiments, to provide uniform illumination through light guide assembly 110, the distance between edge 312 of light guide assembly 110 and LEDs 240 is controlled; variations in spacing can result in variations in illumination.

One embodiment maintains a uniform spacing between a top surface of LEDs 240 and edge 312 of light guide assembly 110 by having edge 312 in direct contact with the top surface of LEDs 240.

In another embodiment, uniform spacing between edge 312 of light guide assembly 110 and the top surface of LEDs 240 is maintained by spacer elements 250 mounted to substrate 230. The use of spacer elements 250 may be desirous when a small, uniform gap between the top surface of LEDs 240 and edge 312 of light guide assembly 110 is desired. Such a gap may be desirable, for example, if the operating temperature of LEDs 240 would deform the material used for light guide assembly 110. In such embodiments it is desirous to maintain a small yet uniform gap; variations in the spacing between the top surface of LEDs 240 and edge 312 of light guide assembly 110 result in variations in illumination, which are to be avoided. Spacer elements 250 therefore provide a uniform spacing.

When used, spacer elements 250 need not be present on every LED lighting module 220 in a LED lighting strip 210, or between each pair of LEDs 240 in a single LED lighting module. As an example, spacer elements 250 may be placed on every other LED lighting module 250 in a LED lighting strip, every third LED lighting module, one spacer element 250 at each end of the LED lighting strip and one spacer element 250 in the middle of the LED lighting strip, and so on.

As shown in the figure, an inset depth 330 is defined as the distance between the edge of front member 200*a* and spacer element 250 if a spacer element is present. If spacer element 250 is not used in an embodiment, the inset depth 330 is defined as the distance between the edge of front member 200*a* and the top of LED 240. In either case, this inset depth 330 is the distance that light guide assembly 110 can be inset into channel 200 of modular illuminated frame member 100.

Modular illuminated frame member 100 may be finished, for example by anodizing or painting, for display as the frame for the display article. In other embodiments, modular illuminated frame member 100 is clad in, or attached to, a surrounding frame 320 as shown in the Figure. This allows for a more traditional frame 320 to be presented visually, hiding modular illuminated frame member 100 from view. As shown, a traditional frame 320, such as a wood frame, may be prepared to receive a frame comprising modular illuminated frame members 100.

Figure 4:
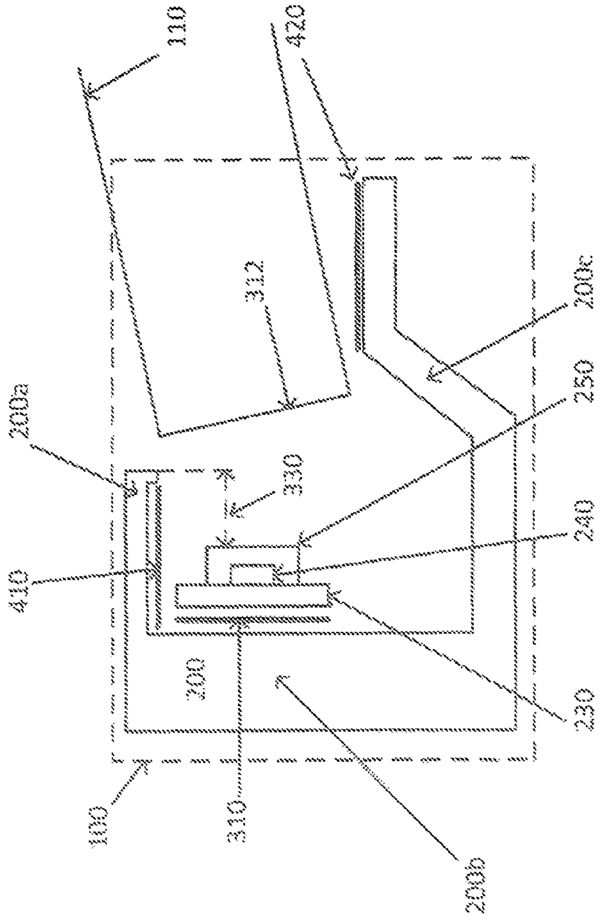
FIG. 4 is a diagram of a modular frame member according to another embodiment.

An additional embodiment of modular illuminated frame member 100 is shown in end view in FIG. 4. It has been learned that the illumination of light guide assembly 110 is improved by the addition of a light reflective material 410 placed on the rear surface of front member 200*a* which reflects light back into light guide assembly 110. an embodiment, light reflective material 410 is a light reflective tape. Light reflective coatings such as a light reflective paint on the rear of front member 200*a* may also be used for light reflective material 410. It should also be noted that such a light reflective material 410 may be employed in any of the embodiments disclosed herein.

As also shown in this embodiment, rear member 200*c* is adapted to allow light guide assembly 110 to be inserted into channel 200 at an angle, allowing for ease of assembly. By placing an adhesive 420 on rear member 200*c* as shown, modular illuminated frame member 100 may be attached to light guide assembly 110 for example by sliding modular illuminated frame member 100 on to light guide assembly 110 at an angle until edge 312 meets either spacer elements 250 or LEDs 240, then rotating modular illuminated frame member 100 and pressing channel edge member 200*c* with adhesive 420 on to light guide assembly 110. When adhesive 420 has set, an attachment has formed, allowing frame assembly in this embodiment without the use of fasteners. A double-sided adhesive tape may be used for adhesive 420, providing for rapid assembly. As an example, a high strength bonding tape such as VHB® tape from 3M® may be used.

In some embodiments, light guide assembly 110 has a metal back plate. In such embodiments, the use of a heat transfer material for adhesive 420, such as thermal transfer tape or a thermal transfer epoxy facilitates the use of the metal back plate of light guide assembly 110 as an additional heat-sink, dissipating the heat generated by LEDs 240 through channel 200 and light guide assembly 110.

Figure 5B:
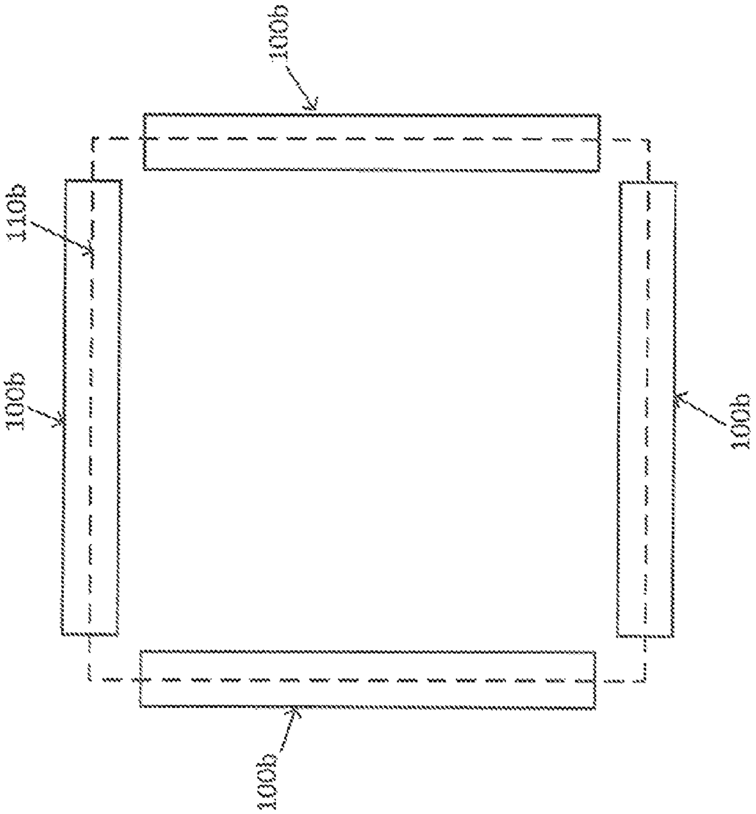
FIG. 5*b* is a diagram of modular frame members according to another embodiment.
Figure 5A:
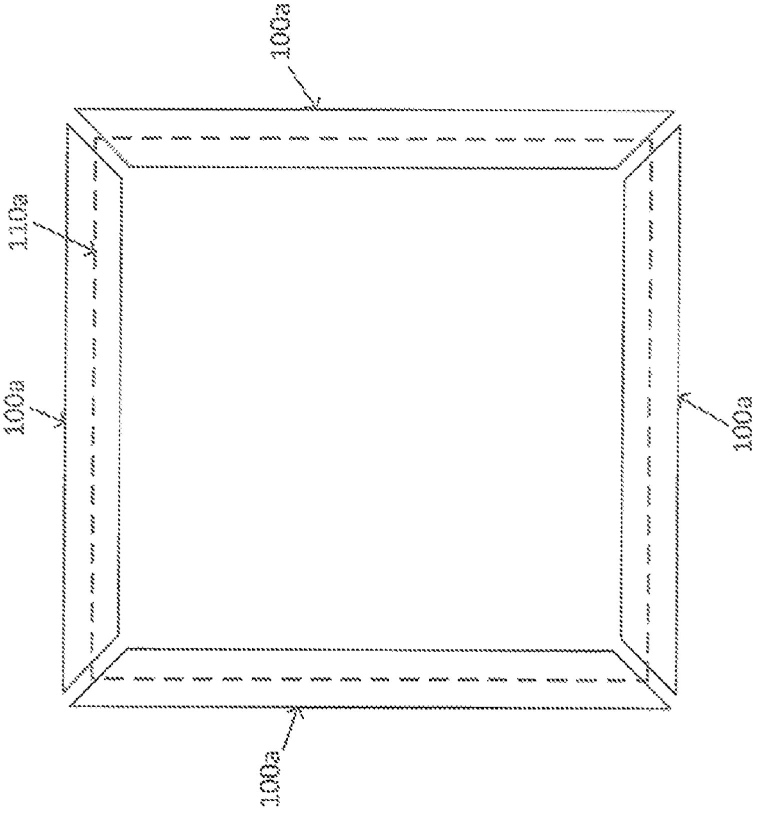
FIG. 5*a* is a diagram of modular frame members according to another embodiment.

FIGS. 5*a* and 5*b* show modular frame members according to additional embodiments. Particularly when the frame members are encased in an outer decorative frame such as that shown as 320 of FIG. 3, open corners, i.e. where the ends of adjacent frame members do not touch each other, may be beneficial. These are shown in FIG. 5*a* as open mitered corners using frame members 100*a*, and with square corners in FIG. 5*b* using frame members 100*b*. Open corners may be beneficial for example in instances where there is concern over thermal expansion of modular illuminated frame members due to the heat generated by the LEDs. Cycles of thermal expansion and contraction could push open tight fitting mitered corners over time, or push other frame members out of alignment; this issue is alleviated using open corners, which allows for expansion or contraction of a frame member without affecting the other frame members.

Figure 6:
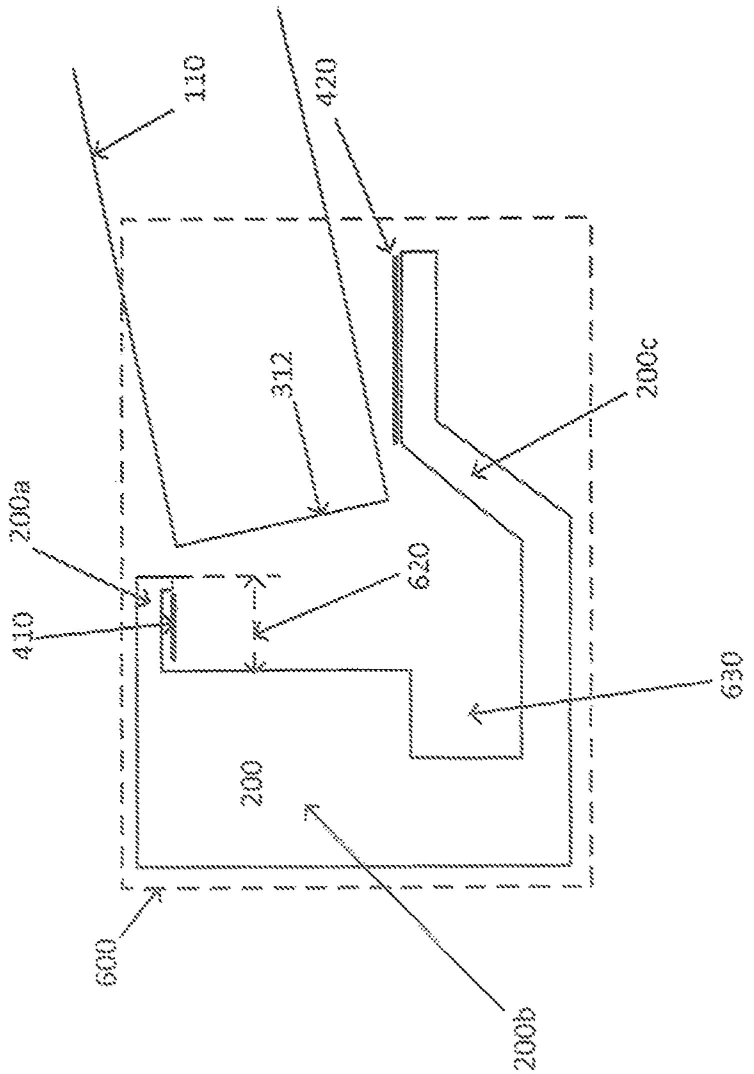
FIG. 6 is a diagram of a modular frame member according to another embodiment.

FIG. 6 shows a non-illuminated frame member 600 in end view according to an embodiment. In this embodiment, non-illuminated, or dummy frame member 600 has a portion of side channel member 200*b* resized so that an inset depth 620, which is the distance between the edge of front member 200*a* and the edge of side member 200*b*, is the same as the inset depth 330 of FIG. 3. Having this same inset depth means that dummy and illuminated frame members may be exchanged with no change in overall dimension, simplifying the framing process.

Also shown is a wire routing 630 accommodating wiring from or between other modular illuminated frame members forming a complete frame. Providing wire routing in both illuminated frame members and dummy frame members allows wiring between illuminated frame members to be enclosed within the frame members.

Referring again to FIG. 1, a complete frame in some embodiments may include more than one modular illuminated frame member 100. In one configuration of such an embodiment, power is supplied electrically in parallel to a first modular illuminated frame member 100, and through that first modular illuminated frame member 100 to a second modular illuminated frame member 100. As an example, this can be through the use of connectors 710 referring again to FIG. 7. It should be noted that in such an embodiment, providing power electrically in parallel to the first and second modular illuminated frame members prevents a failure in the first modular illuminated frame member from affecting the operation of the second modular illuminated frame member in the completed frame.

Light reflective material 410 is applied to the rear surface of front member 200*a*, which reflects light back into light guide assembly 110. In some embodiments, this light reflective material is also applied to at least a portion of side member 200*b* adjacent to edge 312 of light guide assembly 110.

Figure 7:
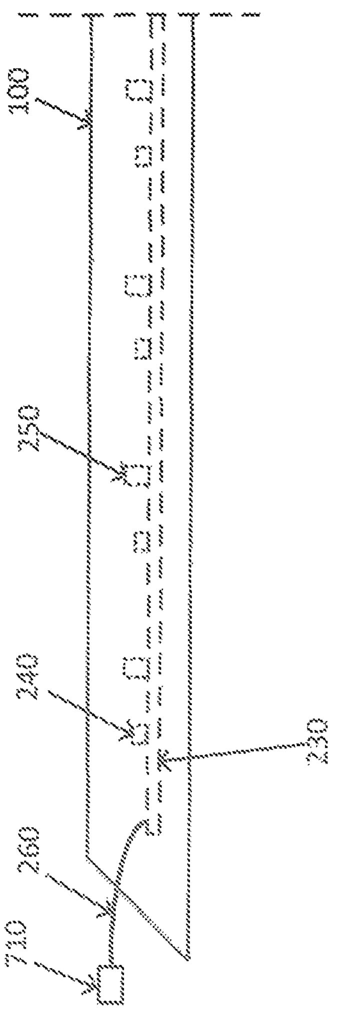
FIG. 7 is a diagram of a modular frame member according to another embodiment.

FIG. 7 shows a modular illuminated frame member according to another embodiment. Modular illuminated frame member 100 has substrate 230 for LED lighting modules 220 which contain LEDs 240 and spacer members 250. Lines 260 for power and optionally data are terminated in connector 710. In the embodiment shown, connector 710 is not mounted to modular illuminated frame member 100 but is left unmounted for manual connection to another connector, such as a mating connector in an adjacent illuminated frame member, or a dummy frame member. In another embodiment, connector 710 may be mounted to frame member 100 such that it mates with a corresponding connector in another illuminated frame member, or in a dummy frame member.

The overall framing process is simplified by using modular connectors. By providing connectors in illuminated frame members and dummy frame members, a frame may be assembled quickly and easily.

In use, an artist or a framing shop would stock modular illuminated framing members and dummy framing members in various lengths, as well as light guide material. Given a translucent or transparent display article to be framed, modular frame members, both modular illuminated frame members, and dummy members are selected to frame the article. As is understood in the framing arts, a mat, which is an opaque material cut to reveal the object and extending to the frame members, may be used. Once dimensions are established, the light guide assembly is cut and assembled. A trial fit may be performed using illuminated and dummy frame members to form the illuminated frame. Dummy frame members may be swapped out for modular illuminated frame members if more illumination is desired for the display article. The illuminated frame is assembled by attaching the frame members to the light guide assembly. If the illuminated frame is to be inset in an outer decorative frame such as shown in FIG. 3, that frame is assembled in the conventional manner and applied to or over the illuminated frame.

Given the various sizes of the modular illuminated frame members, and the corresponding modular dummy members, a wide range of articles can be framed using an assortment of these modular parts.

As is understood in the light emitting diode arts, intensity control of LEDs over a wide range is not accomplished by varying the voltage across the LED, but by applying a constant voltage at a varying duty cycle. This is also known as pulse width modulation (PWM). In the embodiments disclosed herein, such pulse width modulation for intensity control may be supplied by an external power source, or may be included in the drive electronics associated with each LED lighting module. In one embodiment, PWM is combined with a wireless remote control allowing remote control of illumination level.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the herein-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A modular illuminated frame member comprising:

a channel element having a front member, a rear member, and a side member joining the front and rear members, where a distance between the front and rear members of the channel element is sized to be approximately equal to a thickness of a light guide assembly, and a modular light emitting diode (LED) lighting strip having two or more LED lighting modules, each LED lighting module having a substrate and a light emitting diode (LED) attached to the substrate, the LED lighting strip attached to the side member between the front and rear members wherein the LED lighting strip is adapted to set a distance between the LEDs on the two or more LED lighting modules and an edge of the light guide assembly by a spacer element mounted to the substrate of the LED lighting module, and wherein a length of the modular illuminated frame member is determined by the number of the two or more LED lighting modules present in the LED lighting strip.

2. The modular illuminated frame member of claim 1 where the channel element is further configured to include a wire routing for electrical wiring.

3. The modular illuminated frame member of claim 1 where the channel element is made of a heat conductive material.

4. The modular illuminated frame member of claim 3 where the LED lighting strip is attached to the side member between the front and rear members by a heat transfer material.

5. The modular illuminated frame member of claim 4 where the heat transfer material is an adhesive heat transfer material.

6. The modular illuminated frame member of claim 5 where the adhesive heat transfer material is a heat transfer tape.

7. The modular illuminated frame member of claim 3 further including a heat transfer material between the LED lighting module and the channel element.

8. The modular illuminated frame member of claim 3 where the channel further comprises a heat transfer material adapted to transfer heat to a heat conductive element of the light guide assembly.

9. The modular illuminated frame member of claim 1 further comprising a light reflective material located on a rear portion of the front member of the channel element.

10. The modular illuminated frame member of claim 9 where the light reflective material is a light reflective paint.

11. The modular illuminated frame member of claim 9 where the light reflective material is a light reflective tape.

12. The modular illuminated frame member of claim 1 further including an adhesive on a front portion of the rear member of the channel element.

13. The modular illuminated frame member of claim 1 ere the channel element has square ends.

14. The modular illuminated frame member of claim 1 where the channel element has mitered ends.

15. The modular illuminated frame member of claim 1 where at least a portion of the front member of the channel element is mounted to an enclosing frame.

16. A modular framing system comprising:

a first modular illuminated frame member comprising:

an illuminated channel element having a front member, a rear member, and a side member joining the front and rear members, where a distance between the front and rear members of the illuminated channel element is sized to be approximately equal to a thickness of a light guide assembly, and a modular light emitting diode (LED) lighting strip having two or more LED lighting modules, each LED lighting module having a substrate with an LED and a spacer element both attached to the substrate, the LED lighting strip attached to the side member between the front and rear members wherein the LED lighting strip is adapted to set a distance between the spacer element on the two or more LED lighting modules and an edge of the light guide assembly, and wherein a length of the first modular illuminated frame member is determined by the number of the two or more LED lighting modules present in the LED lighting strip, and a dummy modular frame member having a dummy channel element, the dummy channel element having a front member, a rear member, and a side member joining the front and rear members, wherein a distance between the front and rear members of the dummy channel element is sized to be approximately equal to the thickness of the light guide assembly, and wherein an inset depth of the dummy modular frame member is the same as an inset depth of the first modular illuminated frame member.

17. The modular framing system of claim 16 where the dummy modular frame member further includes a wire routing configured to accommodate electrical wiring from the first modular illuminated frame member.

18. The modular framing system of claim 16 further comprising a second modular illuminated frame member, and wherein the first modular illuminated frame member is configured to supply power electrically in parallel to the second modular illuminated frame member.

19. The modular framing system of claim 16 wherein the first modular illuminated frame member and the dummy modular frame member are mounted to an enclosing frame, the first modular illuminated frame member and the dummy modular frame member having ends which are adjacent to each other and forming an open corner.

* * * * *